INVENTORS
Peter Patriarca
Charles E. Shubert
Gerald M. Slaughter

BY

ATTORNEY

United States Patent Office 3,078,551
Patented Feb. 26, 1963

3,078,551
METHOD OF MAKING A TUBE AND
PLATE CONNECTION
Peter Patriarca, Knoxville, Charles E. Shubert, Lenoir City, and Gerald M. Slaughter, Oak Ridge, Tenn., assignors to the United States of America as represented by the United States Atomic Energy Commission
Filed Aug. 5, 1958, Ser. No. 753,398
1 Claim. (Cl. 29—157.4)

This invention relates to the art of joining members together by welding or brazing and more particularly to the joining of metal elements of different bulk, thickness or thermal conductivity where the heating is carried out in a furnace or otherwise.

In the prior art of boilers, heat exchangers, and the like used in conventional fossil fuel systems, it has been the practice in joining relatively thin tubes to headers or tube sheets to insert the ends of the tubes into apertures in the header or tube sheet or plate until the ends of the tubes are flush with the outer face of the header or plate, flare or press the ends of the tubes against the outer face of the plate, and fusion weld them in place.

In the field of nuclear reactors, one of the most important requirements for successful operation is the achievement of absolute leak tightness. All components should be designed and fabricated with a view towards the longest maintainence-free service life. Application of the welding techniques mentioned above to the fabrication of reactor components, particularly to heat exchangers, are not adequate to obviate failures due to thermal stresses resulting from very rapid and large temperature changes which may result during the operation of reactors. Temperatures of the order of 1500–1800° F. which are subject to rapid change produce thermal shock and induce stresses that will rupture or break the conventional welds mentioned above, and in extreme cases, the tubes may be pulled away and separated from the header producing a leaky seal, permitting liquids, some of which may be highly radioactive, to intermingle. (See the December 1957, issue of The Welding Journal, beginning on page 1172, published by the American Welding Society.)

Efforts have been made to overcome these problems by back brazing, i.e., brazing the tube to the plate on the back face of the plate to produce a metal fillet of brazing material between the plate and the tube, but where the tube and the plate are of different thickness or have different thermal conductivities and where heat is applied in a furnace, one of the two members to be joined arrives at the melting point of the brazing material before the other. This causes the brazing material to wet that member, and cling to and crawl along it away from the joint and away from the other member, so that when the other member arrives at the melting temperature of the brazing material, capillary attraction cannot take place where the brazing material has moved out of contact with it. Further heating in the furnace in an effort to complete the brazing step often results in deterioration of the brazing alloy.

Applicants with a knowledge of these problems of the prior art have for an object of their invention the provision of a method of brazing relatively thin walled tubing to a relatively thick header or plate by employing a fillet which minimizes the stress concentration problem by eliminating the notch between the outer wall of the tubing and the inner wall of the plate aperture.

Applicants have as another object of their invention the provision of an arrangement for joining a tube to a plate, tube or other member when seated in a socket therein by employing a fillet of brazing material which will serve to cure or overcome small undetected flaws such as may exist in associated fusion welds.

Applicants have as another object of their invention the provision of an arrangement for joining two members, one of which is socketed in the other, by metallurgically bonding them together throughout their common boundaries to insure optimum heat transfer thereacross and eliminate voids or places where gases or heat exchange fluids may be entrapped.

Applicants have as a further object of their invention the provision of an arrangement including a socketed joint between two members of different thickness or characteristics such that one reaches the melting temperature of the brazing alloy sooner than the other, wherein the brazing alloy is separated from initial contact with the member that reaches the melting temperature of the brazing alloy first to obviate wetting thereof until the other member has reached the melting point of the brazing alloy.

Applicants have as a still further object of their invention the provision of ducts for feeding molten brazing material to a socket joint in an arrangement where a relatively thick plate is joined to a relatively thin tube, when the plate reaches the melting point of the brazing material to insure capillary flow in the socket.

Other objects and advantages of our invention will appear from the following specification and accompanying drawings, and the novel features thereof will be particularly pointed out in the annexed claims.

In the drawings, FIG. 1 is a fragmental cross-sectional view of a conventional welded joint between the outer face of a plate and the end of a tube.

Figure 1:
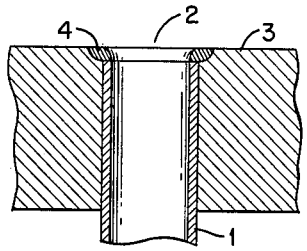
Figure 2:
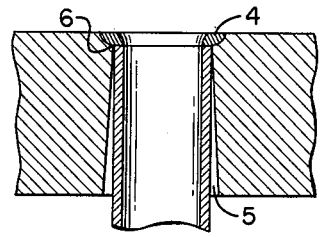
FIG. 2 is a fragmental cross-section of a portion of a plate and tube welded at one end to the outer face of the plate, and showing the notch resulting from thermal stress, in slightly exaggerated form.

Referring to the drawings in detail, as is seen from FIG. 1, it has been the practice in the art of fabricating conventional heat exchangers, boilers and the like, to insert the end of the tube 1 into an aperture 2 in the tube plate or header 3 and fusion weld the outer end of the tube to the front face of the plate or header as indicated at 4. Such an arrangement, however, is not well suited to withstand the thermal stresses encountered in the nuclear reactor field where high temperature and rapid change tends to break the seal and rupture the weld. Differences in temperature, where the tube sheet or header lags the tube, due to differences in thickness, results in a loosening up between the walls of the aperture in the plate and the wall of the tube and produces the notch 5 as indicated in FIG. 2. Since stress concentration occurs at sharp points, the tendency is for it to concentrate at the upper end of the notch 5 near the point 6 adjacent the weld 4. Although corrosion can take place anywhere in the notch, it tends to concentrate at any crevice at or near the upper end of the notch 5. Any liquid may produce corrosion but aqueous solutions are the most common sources. Stress corrosion cracking is an important problem when using stainless steel components, especially in an aqueous environment. In tube plates or headers the perfect situation for corrosion cracking exists since the environment and the corrosive solution are present along with the stress. However, applicants have discovered that if the notch 5 is plugged, the stress in the crevice will be minimized by eliminating the point 6 of major stress. This also has the effect of excluding the corrosion environment from the point 6 where it might have the greatest effect.

alloy into the capillary. However, it is preferably large relative to the capillary. Upon reaching the space between the tube wall and the aperture of the plate, capillary flow of the brazing alloy causes it to penetrate the whole space above and below the outlet of duct 8" and form a complete fillet.

The alloys used may take the form of preformed rings, powders, or tablets. Any suitable, commercially available high temperature alloy compatible with the environment, i.e., the fluids handled and the material of the plate or tubes, may be used. Examples of suitable brazing alloys are indicated in the following table:

| Composition | Specification | Mean Coefficient of Thermal Expansion (in. $10^{-6}$/in. °F.) | | | |
|---|---|---|---|---|---|
| | | At 32–900° F. | At 32–1,300° F. | At 32–1,500° F. | At 1,300–1,450° F. |
| 73.2 Ni—13.5 Cr—4.5 Si—3.5 B—4.5 Fe—0.8 C. | AMS[1] 4775A | 7.15 | 7.35 | 7.55 | 8.32 |
| 82.1 Ni—7.0 Cr—4.5 Si—2.9 B—3.5 Fe | AMS 4777 | 7.35 | 7.36 | 7.47 | 7.95 |
| 91.2 Ni—4.5 Si—2.9 B—1.4 Fe | AMS 4778 | 7.35 | 7.65 | 7.64 | 7.45 |

[1] Aeronautical Material Specification (Society of Automotive Engineers).

Thus back brazing, i.e., from the inner face of the tube plate, provides a fillet which occupies the notch 5, excludes the corrosive environment therefrom, and removes the point 6 of greatest stress.

Figure 3:
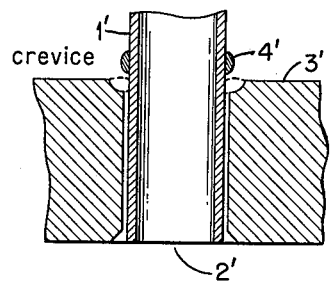
FIG. 3 is a fragmental sectional view of a portion of a plate and a tube showing how the brazing alloy has crawled out of position when the plate has reached the melting temperature of the brazing alloy.
Figure 4:
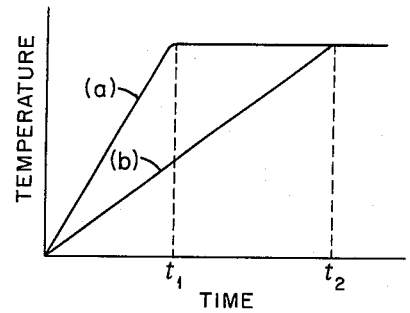
FIG. 4 is a graph of temperature plotted against time for the tube and the plate.

Although back brazing performs the important function of reducing corrosion and meeting the problem of stress, difficulty is encountered in performing the operation where the thickness of the plate is relatively great and the tube is relatively thin. When placed in a furnace and heated with brazing alloy positioned on the inner face of sheet 3' at the mouth of aperture 2', as indicated in FIG. 3, the tube 1' will rise in temperature faster than the thick plate 3' as indicated by the curve (a) of FIG. 4. When it reaches the melting point of the brazing alloy at time $t_1$ the alloy will melt and wet the tube, clinging to it and tending to climb up the tube out of contact with the walls of the plate 3'. Then when the plate 3' at time $t_2$, as indicated by curve (b) of FIG. 4, reaches the melting point of the alloy, it has moved up to a position 4' in FIG. 3 where it is out of contact with plate 3', and where capillary flow for drawing the molten brazing alloy down into the space between the tube 1' and plate 3' does not take place, this contact being a prerequisite for capillary action. Also during the heating process over a period the brazing alloy deteriorates so that if later efforts are successful in positioning the compound between the tube and plate, the quality of the joint is effected. If it is attempted to meet the problem by slowly heating the structure, deterioration of the alloy occurs and even if the prerequisite of having the alloy bridge the capillary space is realized, flow will not take place in the capillary.

Figure 5:
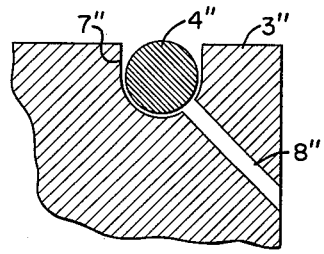
FIG. 5 is a fragmental portion of a thick plate shown in section where the trepanned groove joins the duct which communicates with the capillary channel.

Applicants have discovered the solution to the problem by providing a trepan 7" in the form of an annular groove in FIG. 5 in the inner face of the plate 3" to receive the brazing alloy. While the trepan takes the form of an annular groove, it can take the form of a series of walls or sumps spaced away from the aperture in the plate, so that during the heating up step the alloy 4" remains out of contact with the thin walls of the tube. The brazing alloy will generally assume the temperature of the plate 3", but even if it melts before the plate 3" reaches the melting temperature of the brazing alloy, the walls of the well 7" will lag in temperature and will not wet and adhere to these walls. When the plate 3" reaches the melting point of the brazing compound it will flow by gravity down duct 8" into the capillary between the outer tube wall and the inner wall of the aperture in the plate. It will be understood that the size of duct 8" is not critical since it acts like the spout of a funnel to direct the melted Any combination of tube and header materials that can be furnace brazed including iron-base alloys such as stainless steel, and nickel base alloys such as "Inconel" may be employed. Inconel has the following specification:

| Composition | Specification |
|---|---|
| Inconel | ASTM [1] B168. |

[1] American Society of Testing Materials.

Figure 6:
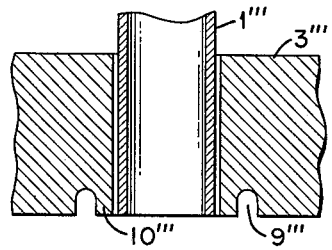
FIG. 6 is a fragmental section showing the trepanned groove in the front face of the plate.

Now referring to FIG. 6, the front face of the plate 3''' is trepanned to provide a groove 9'''. The groove 9''' is preferably located to provide a section 10''' which is of substantially the same thickness as the walls of the tube 1''' so that during the inert fusion welding on the front face of the plate the heat conduction away from the section 10''' will be substantially the same as from the section of the tube 1''' being welded.

Figure 7:
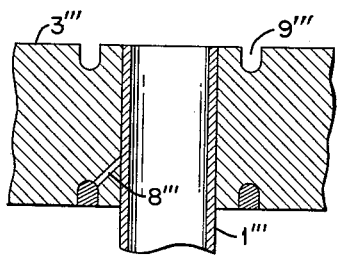
FIG. 7 is a fragmental detail showing the tube in position in the plate and the trepanned grooves with prepositioned brazing alloy in one of them before completion of the joint.

Referring in detail to the joint of FIG. 7, the weld side of the tube sheet is trepanned at 9'''. The trepanning serves to insure good heat distribution by providing a uniform weld configuration and to minimize tube-sheet distortion and restraint in the vicinity of the weld joint.

In back brazing the welded tube 1''' to the tube sheet 3''', the unique heating problem, previously mentioned, existed in that the tube sheet temperature continuously lagged behind the tube temperature throughout the brazing cycle because of the much greater thickness of the tube sheet.

When Coast Metals brazing alloy No. 52 (Aeronautical Materials Spec. No. 4778) was applied by conventional means, the alloy would flow preferentially to the tube 1''' which was the hottest member, and consequently there was poor flow on the tube sheet 3'''.

With the method of brazing preplacement shown herein, the problem was eliminated by separating the brazing alloy from the tube 1''' and placing it in the sheet 3''' in the trepanned groove 7''' where it will remain at substantially the temperature of the tube sheet until the brazing temperature is reached.

The trepanned sump on the brazing side of the tube sheet acts as a reservoir from which the brazing alloy flows through angular ducts 8''' to fill the annulus between the tube and tube sheet to form a fillet by capillary action where the tube meets the tube sheet surface. The ducts 8''' are preferably spaced 120° apart along the annular groove.

Figure 8:
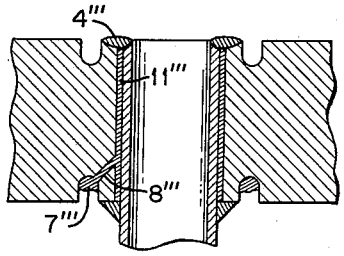
FIG. 8 is a fragmental section of the plate and tube showing the fillet.

In one embodiment a 66 tube Inconel arrangement was prepared using tube sheet 1½ inches thick. A brazing alloy paste (Coast Metal No. 52) was applied to the brazing side, and the tubes (⅝" in diameter and a wall thickness of 1/16") were then inserted in the apertures in the plate and the ends of the tubes on the front or weld side were inert arc welded to the plate forming weld 4''' of FIG. 8. This insures continuity of the material between the plate and the tube at the end, and increased reliability of the joint. Then the joint was back brazed from the inner face, the brazing step being preferably carried out in a dry-hydrogen atmosphere at 1920° F. in a furnace until complete filleting between adjacent surfaces was obtained, as indicated in FIG. 8, and the complete fillet 11''' at all joints provided a high degree of reliability.

Tube sizes have ranged downward to ¼" in diameter with varying wall thicknesses, since it was found that wall thickness was not very critical. Tube sheet or plate thickness has generally been in the range of ½" to 6", and here again, thickness has not been particularly critical.

Having thus described our invention, we claim:

A method of joining a tube to a plate comprising the steps of forming a tube receiving bore in the plate, forming an annular groove in the back face of the plate concentric with the bore and in communication with it over a limited area, inserting one end of a tube in said bore until it is substantially flush with the front face of the plate, welding the front face of the plate to the end of the tube, then positioning brazing alloy in said groove away from the bore and normally out of contact with the tube, and applying heat to the plate and tube to melt the brazing alloy to permit it to flow into the bore and into contact with the tube and bond the tube to the plate.

References Cited in the file of this patent

UNITED STATES PATENTS

| | | |
|---|---|---|
| 653,280 | Barthels | July 10, 1900 |
| 837,767 | Aimes | Dec. 4, 1906 |
| 920,743 | Hines | May 4, 1909 |
| 1,866,857 | Lindquist | July 12, 1932 |
| 2,113,060 | Sandberg | Apr. 5, 1938 |
| 2,399,103 | Clinedinst | Apr. 23, 1946 |
| 2,464,541 | Young | Mar. 15, 1949 |
| 2,662,277 | Stone | Dec. 15, 1953 |
| 2,857,178 | Mitchell | Oct. 12, 1958 |